United States Patent
Partyka

(10) Patent No.: US 6,728,293 B1
(45) Date of Patent: Apr. 27, 2004

(54) HOPPING PATTERN GENERATION METHOD IN FREQUENCY HOPPING SYSTEM FOR INTERMITTENT TRANSMISSION

(76) Inventor: Andrzej Partyka, 370 Finch La., Bedminster, NJ (US) 07921

( * ) Notice: Subject to any disclaimer, the term of this patent is extended or adjusted under 35 U.S.C. 154(b) by 0 days.

(21) Appl. No.: 09/395,628

(22) Filed: Sep. 14, 1999

(51) Int. Cl.[7] .......................... H04B 15/00; H04K 1/00; H04L 27/30

(52) U.S. Cl. .................................. 375/131; 340/870.15

(58) Field of Search ................................ 375/259, 260, 375/295, 316, 130, 131, 132, 133, 138; 340/870.11, 870.15, 870.01

(56) References Cited

U.S. PATENT DOCUMENTS

| | | |
|---|---|---|
| 4,040,054 A | 8/1977 | Overman |
| 4,435,821 A | 3/1984 | Ito et al. |
| 4,606,041 A | 8/1986 | Kadin |
| 4,612,652 A | 9/1986 | Kadin |
| 4,614,945 A | 9/1986 | Brunius et al. |
| 4,653,068 A | 3/1987 | Kadin |
| RE32,905 E | 4/1989 | Baran |
| 4,843,638 A | 6/1989 | Walters |
| 5,079,768 A | 1/1992 | Flammer |
| 5,121,407 A | 6/1992 | Partyka et al. |
| 5,204,855 A | 4/1993 | Bebee et al. |
| 5,390,166 A | 2/1995 | Rohani et al. |
| 5,400,246 A | 3/1995 | Wilson et al. |
| 5,408,506 A | 4/1995 | Mincher et al. |
| 5,428,602 A | 6/1995 | Kemppainen |
| 5,428,637 A | 6/1995 | Oliva et al. |
| 5,438,329 A | 8/1995 | Gastouniotis et al. |
| 5,517,187 A | 5/1996 | Bruwer et al. |
| 5,546,422 A | 8/1996 | Yokev et al. |
| 5,548,582 A | 8/1996 | Brajal et al. |
| 5,586,141 A | 12/1996 | Ashdown et al. |
| 5,610,907 A | 3/1997 | Barrett |
| 5,659,303 A | 8/1997 | Adair, Jr. |
| 5,748,100 A | 5/1998 | Gutman et al. |
| 5,956,621 A | 9/1999 | Weiss et al. |
| 6,058,137 A | 5/2000 | Partyka |
| 6,144,693 A | 11/2000 | Tabeta |
| 6,188,715 B1 | 2/2001 | Partyka |

OTHER PUBLICATIONS

Robert C. Dixon, "Spread Spectrum Systems", Johm Wiley & Sons, 1984 ISBN 0–471–88309–3, pp.: 52–54, 217–235.
Marvin K. Simon, et al., "Spread Spectrum Communications", Computer Science Press, 1885. ISBN 0–88175–017–4, vol 1, pp. 352–358, vol 3, pp. 386–398.
Don J. Torrieri, "Principles of Secure Communications Systems", Artech House 1985, ISBN 0–89006–139–4. pp. 212–215, 132, 148–150, 134–135, 92–97.
Kamilo Feher, "Digital Communications: microwave applications", Prentice–Hall Inc, 1981, ISBN 0–13–214080–2. pp. 155, 156–161, 163–165.

*Primary Examiner*—Jean B. Corrielus

(57) ABSTRACT

A radio transmission system including many radio transmitters using frequency hopping carriers to intermittently transmit very short messages indicative of status of stimuli associated with the transmitters. The transmitters transmit transmissions independently of a receiver receiving the transmissions and independent of each other. In operation, radio transmitters transmit messages at varying frequencies at time intervals that can be varied as well. The frequency and time intervals are varied according to patterns that can be determined individually for each transmitter. A receiver holds data indicative of the future transmission frequency and time for each transmitter and updates the data based on the time and the content of the received messages. In addition, a simple method is provided to generate a very large number of orthogonal frequency-time hopping sequences that are individual for each transmitter and based on the transmitter ID.

15 Claims, 5 Drawing Sheets

HOPPING PATTERN GENERATION METHOD IN FREQUENCY HOPPING SYSTEM FOR INTERMITTENT TRANSMISSION

FIELD OF THE INVENTION

The present invention relates to telemetry in general, and, more particularly, to a system in which a plurality of transmitters wirelessly transmit data for collection by one or more receivers.

BACKGROUND OF THE INVENTION

Some wireless telemetry systems (e.g., burglar alarms, fire alarms, power utility meters, leak detectors, environmental monitoring, etc.) comprise many transmitters that periodically or sporadically transmit messages to one or more receivers. In these systems, the transmitters are located at different places and transmit messages that are indicative of the status of monitoring sensors to a receiver that collects the data from all of the sensors. Normally, the transmitters transmit messages that are as short as feasible and with the interval between the transmissions as long as feasible. This is advantageous for two reasons. First, it minimizes the average current drain in the transmitters, which are typically battery operated. Second, short and infrequent transmissions lower the probability that the data is lost due to collisions that occur when two or more transmitters transmit at the same time. However, if an alarm occurs, the associated transmitter transmits immediately in order to convey the alarm message with little delay.

Typically, such systems transmit data at a single frequency, and thus are susceptible to interference and signal loss due to a phenomena known as "multipath fading." Consequently, the reliability of such systems is compromised or, conversely, the transmitted power has to be increased to overcome the fading which results in larger power drain and shorter battery life. Besides, there usually are regulatory limits that restrict such transmitter power and thus limit the possible compensation by sheer increase of power. Since the multipath effect is highly sensitive to the frequency of the transmitted carrier, a system using multiple frequencies (e.g., a frequency hopping spread spectrum system, etc.) has a potential to eliminate these drawbacks. However, frequency hopping systems require a long acquisition time and they are typically used in two way communication applications in which all the devices are continuously synchronizing with one master device or with each other using a variety of synchronization methods as shown in some references. In other cases, to ease the synchronization problem, there are employed receivers that can simultaneously receive signals at many frequencies by making the receiver broadband or by using several receivers at the same time. Generally, those solutions suffer from performance degradation or high cost or both which makes them undesirable for low cost applications that require high reliability such as security systems and some telemetry systems.

A serious problem that must be addressed in battery operated systems is to shorten the transmission time as much as possible by making the message preamble as short as possible in order to conserve the battery power. Therefore, the synchronization of the receiver with the transmitters is a difficult task. This problem is exacerbated in some systems such as security alarms that require some messages to be conveyed to the system immediately without waiting for the scheduled transmission time. A related problem, in battery operated systems, is limitation of the transmitted power to conserve the battery power.

SUMMARY OF THE INVENTION

Some embodiments of the present invention comprise a frequency hopping receiver that acquires and maintains synchronization with a plurality of transmitters, which enables the transmitters to omit the transmission of long preambles. This is advantageous because it lowers the average current drain in the transmitters and, consequently, lengthens their battery life. Furthermore, some embodiments of the present invention are advantageous in that they provide improved reliability in the presence of multipath fading, interference and jamming. And still furthermore, some embodiments of the present invention are capable of eliminating the effect of persistent collisions that occur when two or more transmitters transmit at the same time in the same channel for a prolonged period.

The illustrative embodiment of the present invention is a frequency-hopping wireless telemetry system comprising: (1) one or more receivers, and (2) one or more transmitters, each of which receive input from one or more sensors. The transmitters intermittently transmit very short messages indicative of status of the sensors associated with the transmitters. Each transmitter includes a time interval generator to establish the time interval between successive transmissions, a frequency synthesizer-modulator to generate a modulated radio frequency carrier signal wherein the frequency of the carrier changes in response to programming the synthesizer by digital data, a reference frequency oscillator to provide a frequency reference from which the synthesizer derives carrier frequencies and, advantageously, from which the time interval generator derives its timing, and a transmitter control logic activated in response to pulses from the time interval generator or a sensor signal indicating an abnormal condition. When activated, the transmitter control logic activates and programs the synthesizer so that the transmitter carrier frequency is changed according to a frequency hopping algorithm, provides digital data indicative of the sensor status and advantageously battery status, and modulates the carrier with the provided data. The receiver includes a frequency selective radio receiver circuit, programmable by digital data, to receive and demodulate a transmitted carrier when the frequency of the receiver circuit is programmed according to the frequency of the carrier, and a receiver control logic means to process demodulated data, to provide system interface responsive to the received messages, and to program the frequency of the frequency selective receiver circuit. The control logic includes a receiver timer to measure the elapsing time, and a plurality of memory registers to hold digital data indicative of (a) the time of the next transmission occurrence for each transmitter and (b) the frequency of the next transmission occurrence for each transmitter. In operation, the control logic sequentially compares the data content of the time registers with the data content of the timer and if the transmission is due from a transmitter, the control logic programs the frequency selective radio receiver circuit according to the data content in the frequency register associated with said transmitter, attempts to decode the demodulated signal, modifies the content of the time register by a number representative of the time interval between the successive transmissions for said transmitter and modifies the content of the frequency register according to a predetermined algorithm for said transmitter.

In accordance with the illustrative embodiment of the present invention there is provided a method of transmission in the system so as to improve reliability of the system in the presence of multipath fading and interference, the method is based on varying the transmission frequency for each transmitted message and varying the time between consecutive messages. The frequency variations provide frequency diversity and are effective against multipath fading as well as single of multiple narrowband interference. The time variations are effective against periodic impulse interference. In combination, the frequency and time variations provide immunity for a wide variety of signal impairments and interference including multipath fading, wide and narrowband interference, impulse noise and deliberate jamming.

In accordance with the illustrative embodiment of the present invention there is provided a method of minimizing the effect of collisions, the method is based on selecting the transmission frequencies in sequences that are different for each transmitter, wherein transmitter frequency sequence depends on the transmitter ID number or other number derived or associated with the transmitter ID. In addition, in the illustrative embodiment, the transmitter ID number or other number derived or associated with the transmitter number is included in the transmitted message, so that, upon reception of a single message from a transmitter, the receiver can determine what is the next frequency for this transmitter, and thus achieve synchronization with this transmitter.

In accordance with the illustrative embodiment of the present invention there is provided another method of minimizing the effect of collisions that can be used alone or in conjunction with the third aspect of this invention, the method comprising randomizing the time interval between transmissions individually for each transmitter and a receiver compensating for the time interval changes.

In accordance with the illustrative embodiment of the present invention there is provided a simple method to generate a very large number of frequency-time hopping sequences. The method produces sequences that are orthogonal, thus eliminates possibility of persistent collisions even when large number of transmitters are used. In addition, the method requires identical circuit in each transmitter and the actual sequence that is produced is selected by the transmitter ID or other number associated with the transmitter ID, thus making it convenient for manufacturing. Also, the method enables to produce a very large number of frequency-time sequences based on a single short PN generator whose state can be instantly recovered by a receiver based on just one received transmission, thus aiding the receiver in obtaining synchronization with a transmitter whose ID is known. At the same time, because of a very large number of possible sequences that can be generated, it is difficult to obtain synchronization if the transmitter ID is not known, which makes the system immune to interception and jamming.

In accordance with the illustrative embodiment of the present invention there is provided a method that enables such a system to convey the information about an abnormal sensor condition as soon as the condition occurs regardless of the transmission period of the associated transmitter. The method is based on selecting an alarm frequency or advantageously a group of alarm frequencies common for all transmitters. The alarm frequencies are used by the transmitters when an alarm or an abnormal sensor condition occurs or on power-up, wherein when such a condition occurs in a transmitter, the transmitter transmits the messages sequentially on the alarm frequencies for a predetermined period of time after which the transmitter resumes transmissions according to the sequence before the alarm condition, wherein the receiver monitors the alarm frequencies during the time between the reception of scheduled messages from the transmitters.

DETAILED DESCRIPTION

Figure 5:
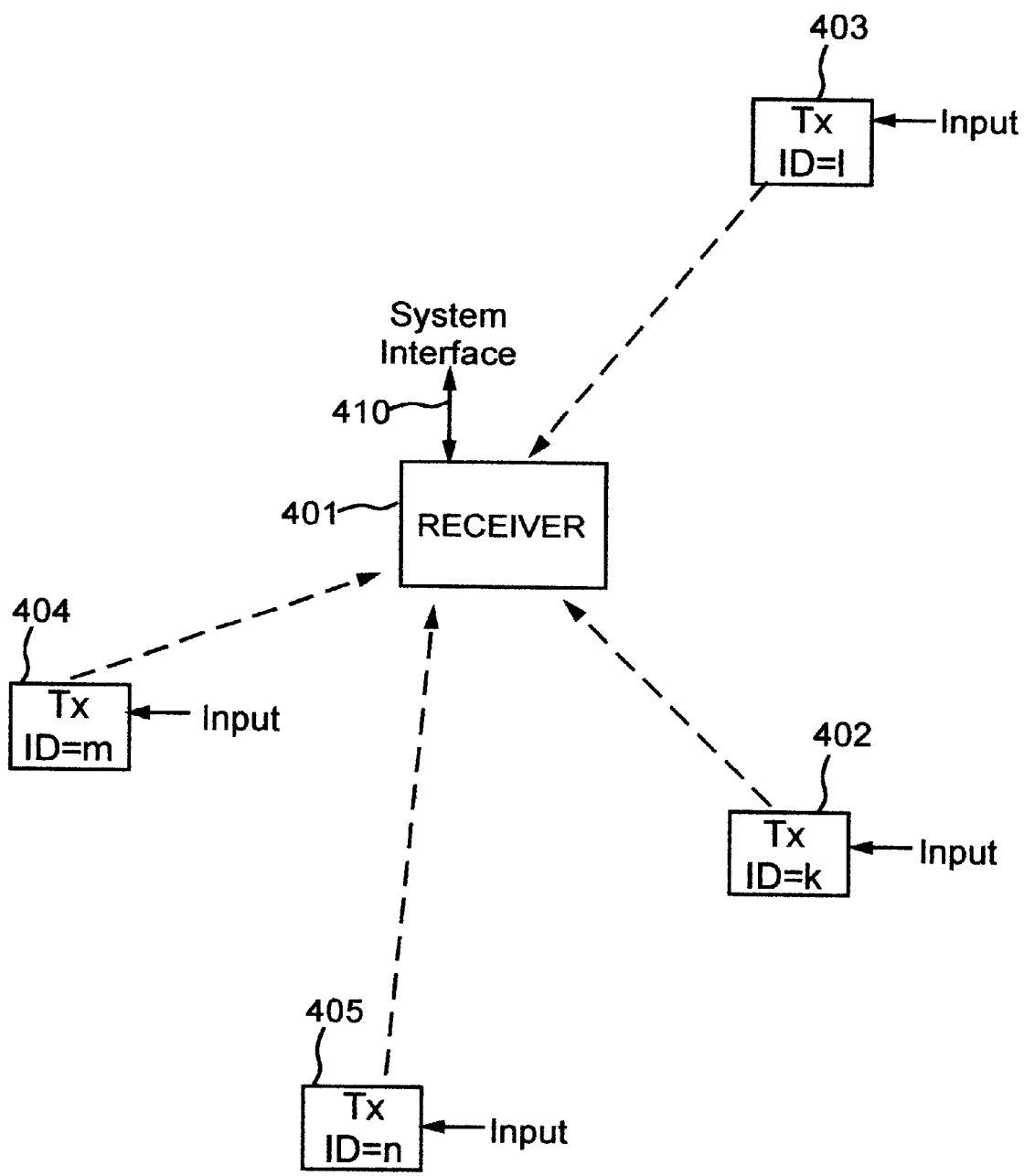
FIG. 5 is a block diagram depicting the frequency hopping system including many transmitters and a receiver.

Referring to FIG. 5, the frequency hopping system includes a radio receiver 401 and a plurality of radio transmitters 402, 403, 404 and 405. The radio receiver includes a system interface 410 through which the receiver can be connected to a variety of interface equipment, a controller, or a computer. Each transmitter includes an interface or a sensor or an operation to be monitored. Each transmitter intermittently transmits short messages to the receiver respectively. The transmitters are not connected to each other and do not receive messages back from the receiver. The transmitters transmit messages when they need to without any regard to other transmitters, as the transmitters are not synchronized with each other.

Figure 1:
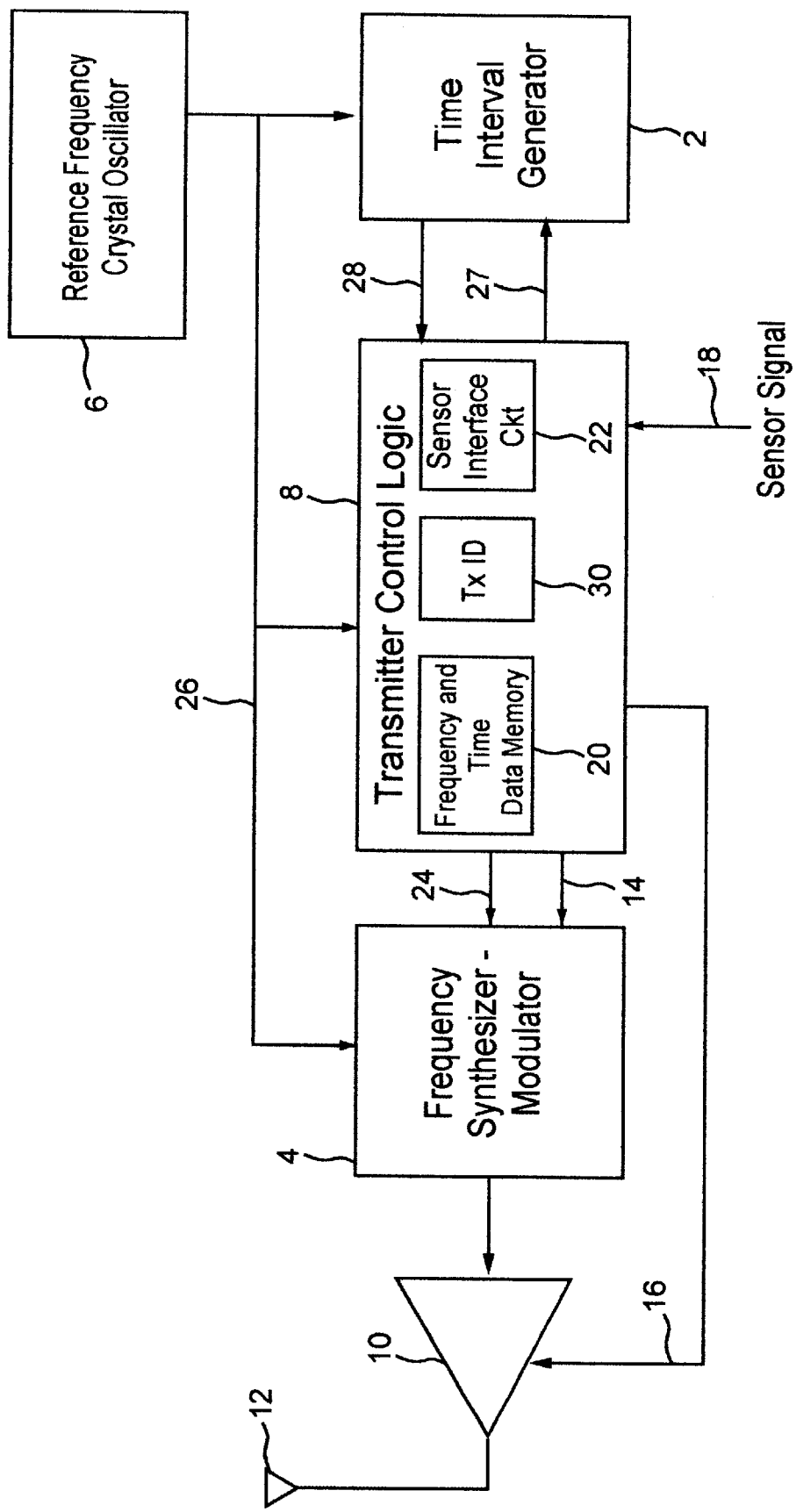
FIG. 1 is a block diagram of a transmitter according to a advantageous embodiment of the present invention.

Referring to FIG. 1, the transmitter includes a reference frequency crystal oscillator 6 to produce a stable frequency on line 26, a time interval generator 2 establishing a time base to produce pulses on line 28 activating the transmitter, a frequency synthesizer-modulator 4 to produce a radio frequency carrier modulated by modulation data fed to the synthesizer via line 24 wherein the frequency of the carrier is programmed to a desired value via plurality of lines 14, transmitter control logic 8 to activate and program the synthesizer-modulator 4 via plurality of lines 14 when the logic is activated by a pulse from the time interval generator or by an abnormal signal indication on a sensor signal input line 18, an amplifier 10 to amplify the radio carrier provided by the synthesizer when the amplifier is activated by the control logic 8 via line 16, and an antenna 12 to radiate the power delivered by the amplifier. The control logic 8 includes a frequency and time data memory register 20 to hold information used to determine the time and the frequency of next transmission, and a sensor interface circuit 22 to accept the sensor signal and detect an abnormal signal condition, and to convert the sensor signal to a digital format suitable for transmission. The transmitter logic also includes a storage means 30 to store a transmitter ID number to differentiate this transmitter from other transmitters. The transmitter control logic, in some systems, can be realized based on microprocessor, in some other systems, a specialized application specific integrated circuit—ASIC component may be used.

In operation, during the time between transmissions, the transmitter is in a standby mode in which the amplifier 10 and synthesizer-modulator 4 are not active and, advantageously, the control signals turn off the power from these circuits in order to minimize the standby current of the transmitter. The transmitter control logic 8 is in a standby mode in which the most of the circuits are inactive and some or most of the circuitry can be powered down with the exception of the circuits supporting critical functions; (a) the sensor interface circuit 22 that detects an abnormal signal condition and produces a binary signal that is logically combined with the signal 28 produced by the time interval generator so that when either a pulse or abnormal condition occurs the rest of the transmit logic circuitry is activated or powered up, (b) the frequency and time data memory 20 that has to retain the data during the period between transmission and consequently either it has to be a nonvolatile type or it has to be powered up during the period between transmissions. Upon activation, the control logic 8 determines the activation source by reading signals 28 and 18.

When the logic 8 is activated by a pulse 28 from the time interval generator the following sequence of events occurs. First, the logic reads the frequency data memory and produces a data packet that includes the sensor status, the transmitter ID number and other data such as battery status. Then, the logic activates and programs the synthesizer-modulator 4, activates the amplifier 10 and sends the packet to the modulator via line 24. After completion of each transmission, the transmitter logic sets the transmitter in the standby mode until activated again by a pulse on line 28 or a sensor abnormal condition indicated on line 18.

In the advantageous embodiment the transmission of a packet can be repeated a predetermined number of times at separate frequencies, wherein the number of repetitions is chosen according to application needs and, wherein the frequencies are determined by the transmitter logic according to an algorithm described later in details. This way, it is possible for the receiver to receive some repeated packets even if the other packets are lost due to frequency selective fading caused by multipath or due to interference. Similarly, a single packet can be split into several pieces and each piece transmitted at a separate frequency. In yet another embodiment, it may be advantageous to use more than one carrier at the same time to improve reliability, however this would require a more complex transmitter.

When a sensor abnormal condition occurs, the sensor interface circuit 22 produces an active level of the signal indicative of the sensor abnormal level which activates the transmitter via a combinatorial logic circuit that combines the sensor abnormal level signal with the pulses from the time interval generator. When activated this way, the transmitter control logic 8 produces a data packet that includes the sensor status, then the logic activates and programs the synthesizer-modulator 4, activates the amplifier 10, and sends the packet to the synthesizer-modulator. In the advantageous embodiment, the transmission of the alarm packet is repeated a predetermined number of times using a plurality of predetermined alarm frequencies in such a way that the transmission frequency is changed after each single packet transmission according to a predetermined fixed sequence. In the illustrative embodiment, when the alarm packets are transmitted, the time intervals between transmissions are minimal; when one transmission is completed, the transmitter programs to the next frequency after a small predetermined interval and repeats the packet transmission, etc. It should be noted that the existence of the predetermined alarm frequencies is not necessary albeit advantageous. In an alternative design, the transmitter may follow the normal hopping pattern but at an increased rate repeating the alarm message a predetermined number of times. The essence of the idea is that the alarm message being infrequent can afford a much greater transmission overhead and can be repeated many times. If the alarm message is transmitted at fewer frequencies, a faster response of the receiver will be observed on average.

After the transmission sequence is completed, the control logic disables the signal indicative of the sensor abnormal status so that an abnormal sensor status can not activate the control logic. Then, the control logic puts the transmitter in the standby mode until activated by a pulse from the time interval generator. When subsequently activated, the transmitter control logic performs the usual transmission sequence but the data packets include information that the sensor condition is abnormal if the condition persists. When the abnormal condition subsides, the signal indicative of an abnormal status is enabled so that a subsequent occurrence of an abnormal condition can activate the logic and trigger a new alarm transmission sequence. Thus, normal operation is restored.

Although FIG. 1 shows a specific illustrative embodiment, it is apparent that various modifications may be realized such as including more than one sensor, placing different ID in each sensor, or even placing the entire control logic in a sensor, or combining transmitter and sensor, etc.

In the advantageous embodiment, the sequence in which the frequencies are used is different for different transmitters. The following is the description how this is accomplished in the advantageous embodiment. Each transmitter includes a pseudo random sequence generator or pseudo noise—PN generator, wherein a pseudo random sequence generator is based on a linear feedback shift register, and wherein some outputs of the shift register are fed back to an EX-OR (Exclusive OR) gate whose output is connected to the register input. For a certain combination of the outputs that are fed to the EX-OR gate, the shift register can produce a sequence that has $2^N-1$ bits, wherein N is the length of the shift register. Such a sequence is called a maximum length sequence. Alternatively, if all the outputs of the shift register are taken at a time, then a pseudo random sequence of $2^N-1$ numbers is created, wherein all the numbers have N digits and each number differs from all the other numbers in the sequence; the numbers range from 1 to $2^N-1$. For example, a generator based on a 3-bit shift register produces a sequence consisting of 7 3-bit numbers. The numbers range from 1 to 7. Such PN generators are well known to the skilled in the art.

Figure 3:
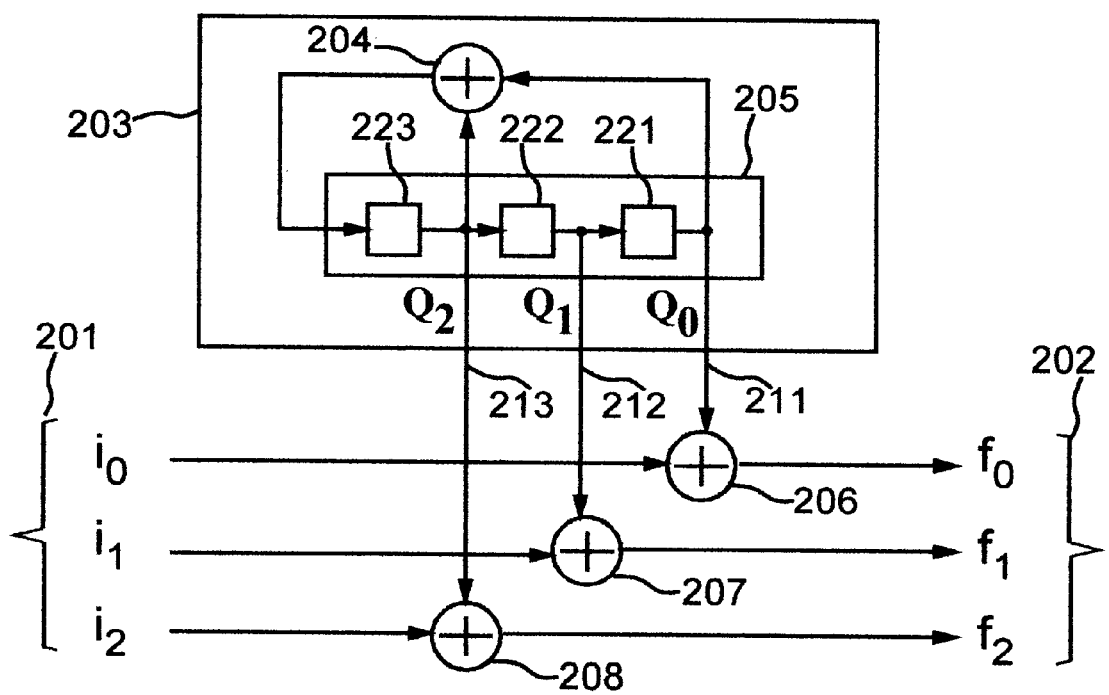
FIG. 3 is a block diagram of an example of illustrative embodiment of a sequence generator used to determine the individual frequency sequences.

Referring to FIG. 3, the pseudo random sequence generator 203 consists of a shift register 205 and EX-OR gate 204. The shift register 205 is composed of three stages 221, 222, and 223 having three outputs $Q_0$ 211, $Q_1$ 212 and $Q_2$ 213 respectively. The feedback is taken from outputs $Q_0$ and $Q_2$. The three least significant bits of the transmitter ID $\{i_2, i_1, i_0\}$ 201 are combined with the output of the pseudo random sequence generator $\{Q_2, Q_1, Q_0\}$ using EX-OR gates 208, 207, and 206. The result can be used to indicate the frequency or frequency channel or frequency index $\{f_2, f_1, f_0\}$ 202 indicative of the frequency over which the transmission will occur.

Assuming that the initial state of the shift register is binary 111 (decimal 7; $Q_2=1$, $Q_1=1$ $Q_0=1$), the produced sequence is $\{7, 3, 5, 2, 1, 4, 6\}$. These numbers are then combined with the last three bits of the transmitter ID using bit by bit EX-OR operation; i.e. the last bit of the transmitter ID ($i_0$) is combined with the last bit of the random number ($Q_0$), etc. This way produced new sequence has numbers ranging from 0 to 7 the order of which depends on the last three bits of the transmitter ID. Thus, 8 distinct (permuted) sequences of numbers are created.

For example, if the last digits of the transmitter ID are 000, then the frequencies are selected in the order 7, 3, 5, 2, 1, 4, 6, i.e. the sequence is not altered. If the last three digits of the transmitter ID are 001, then the frequencies are selected in the order 6, 2, 4, 3, 0, 5, 7; if the last three digits of the transmitter ID are 010, then the frequencies are selected in the order 5, 1, 7, 0, 3, 6, 4; etc. Notice, that each newly created sequence is not, strictly speaking, a permutation of the basic sequence because in each new sequence one number is converted to 0; e.g. in the first example 1 was converted to 0 in the process, in the second example 2 was converted to zero. However, for the purpose of this application the operation is regarded and called a "permuting operation" or a "permutation", or "permutation proces", etc. Similarly, the resulting sequence is called "permuted sequence".

In the illustrative embodiment, the sequence length depends on the number of frequencies used by the system. For example, if the available bandwidth is 26 MHz and the frequencies are separated by a 100 kHz interval, then there are 260 frequencies—channels available for transmission. I.e. the sequence length can be 255 by using an 8-bit shift register. By processing the output of the PN generator with 8 transmitter ID bits, a 255 different frequency sequences are obtained.

It is apparent that any two sequences are quite different even though the ID number is changed only on one position. In fact, the sequences are orthogonal, i.e., for any two sequences, a coincidence of two numbers occurs only once for the entire period of the PN generator.

This is advantageous since it lowers the probability of persistent collisions that may happen if two or more transmitters transmit at the same time and at the same frequency for a prolonged time. It should be stressed that using the sequences as described ensures that the persistent collision between any two transmitters is not possible since the frequencies in any arbitrary pair of sequences do not coincide persistently regardless of the relative shift of the sequences.

For each transmitter, the future frequency can be predicted based on just one partially received mess age because each message includes the transmitter ID based on which the receiver can determine the content of the frequency index generator. To see how this can be done one needs to notice that the permutation process according to the illustrative embodiment is reversible: i.e., if the same ID digits are applied again to the frequency index, the PN generator state is obtained. If the receiver receives a least a part of a message from a transmitter, the frequency index is known. It is only necessary to know the digits of the transmitter ID. The transmitter ID digits are included in the messages. Advantageously, they are placed at the end of the message so that the receiver can recover them even if it starts the reception of the transmission in the middle of the message.

In some applications, this number of sequences my not be sufficient. For example, in many applications, the transmitter IDs are generated sequentially in the factory and embedded in the transmitter circuit. It would not be convenient or sometimes not even possible to make sure that all the transmitters to be installed on one premise or in geographical proximity would produce orthogonal sequences. In such cases the number of sequences can be extended to a larger number using other techniques, some of which were extensively studied and are described in the available literature. The number of available permutations of a sequence that has 127 numbers is 127! ($\approx$3E213). Even if a small subset of all the available permutations is used there will be a large and adequate number of frequencies produced. This way, the manufacturer can still embed sequentially produced ID numbers and the transmitters could still be used without regard to the sequences that they produce. However, the method described above is advantageous for its simplicity and the unique properties or orthogonality of all sequences. The degree of orthogonality indicates how many hits (frequency agreements) the re may be between two sequences upon any relative cyclic shift of the sequences. In a perfect design, for any two sequence that use the same set of frequencies, there would be only one hit. I.e., if upon any cyclic shift of two sequences, a position is found in which the same frequency is present in both sequences, then the frequencies in all other positions would differ. The sequences produced in a manner as described in the advantageous embodiment are orthogonal in that sense. Although perfect orthogonality is not necessary for proper operation of the system, it is desirable since it reduces the probability of lost packets due to collisions. However, it should be apparent that other ways of permuting the sequences could be created. Another advantage of the advantageous method of permutation is that the permutation process is reversible as previously described. This property enables the receiver to synchronize based on the transmitter ID embedded in the transmitted messages without a need for additional information bits related to the PN generator status. Since the transmitter ID is normally required in the transmitted messages, the advantageous method does not require any overhead in the transmitted messages.

In order to preserve the property of orthogonality and zero overhead as described above and enlarge the number of transmitter ID universe the following advantageous method is employed.

Normally, the time intervals between transmissions are controlled by a quartz crystal and, ideally their nominal values are the same for all transmitters, however in the advantageous embodiment, the time intervals are perturbed by small time increments to further randomize the transmission events and lower the probability of persistent collisions with other transmitters as well as avoiding an intentional or unintentional pulsed interference. The transmitter control logic can accomplish this by programming the time interval generator via line 27 (FIG. 1) according to a predetermined algorithm. The information about the current status of the algorithm may be included in the transmitted packet to aid the receiver operation.

In the advantageous embodiment, the method of determining the time interval perturbation is based on a similar technique as described in conjunction with the frequency index generation, wherein the random sequence is used to alter the time interval between transmissions. I.e., each time a transmission is performed, a new number is generated and used to determine the time interval between the current and the next transmission. Wherein, the time randomization is accomplished by processing the output of the PN generator used for the frequency index with bits of the transmitter ID. The processing is done as follows.

Figure 4:
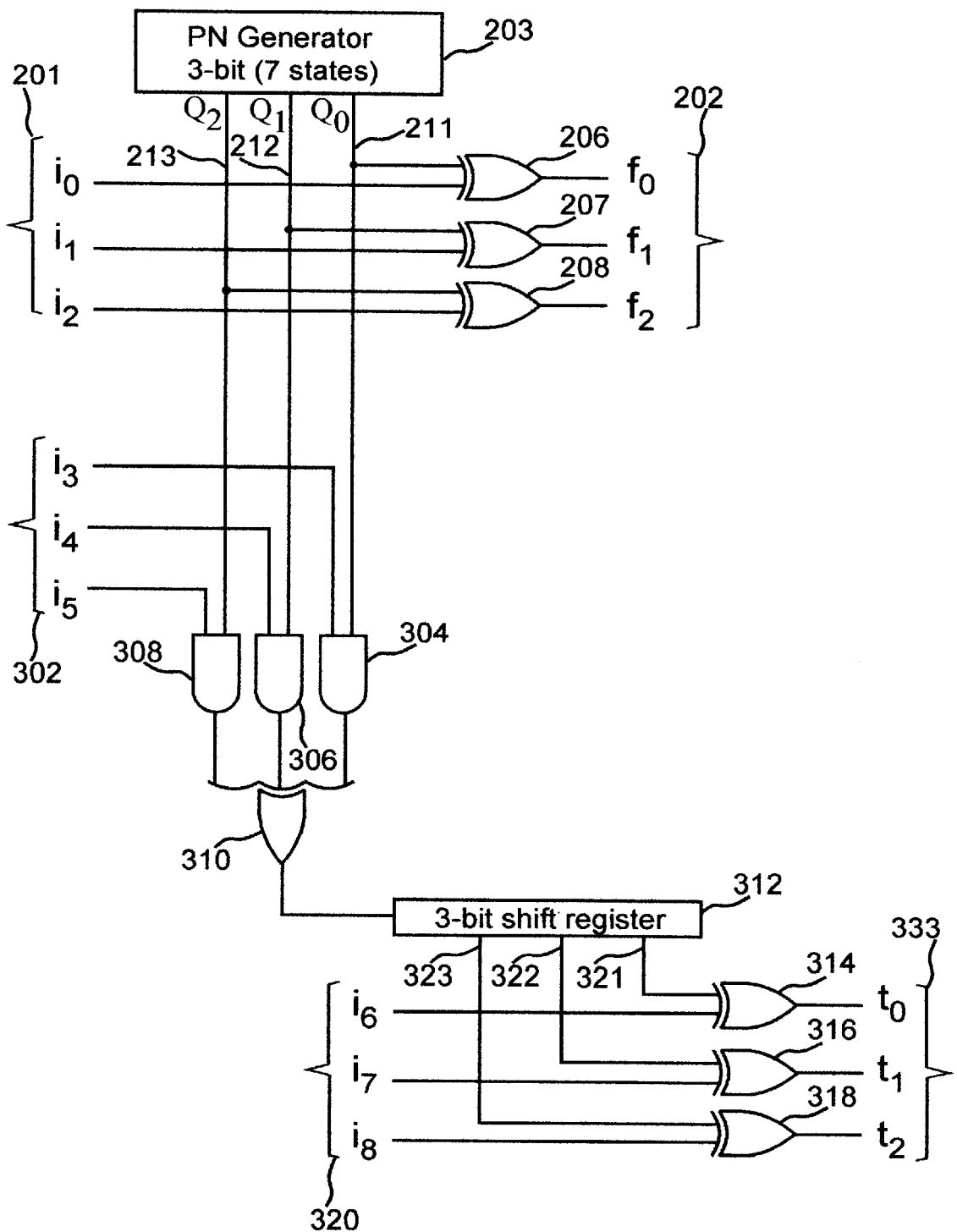
FIG. 4 is a block diagram of an example of a illustrative embodiment of a sequence generator used to determine the individual frequency time sequences.

Referring to FIG. 4, the frequency index is produced by the PN generator 203 outputs 213, 212 and 211 and transmitter ID bits 201—$\{i_2, i_1, i_0\}$ processed with EXOR gates 208, 207, and 206 to produce index digits 202—$\{f_2, f_1, f_0\}$ as described previously in conjunction with FIG. 3. The PN generator output is further processed with transmitter ID digits 302—$\{i_5, i_4, i_3\}$ by the AND gates 308, 306 and 304 and by an EXOR gate 310. The output of the gate 310 taken one bit at the time is a shifted replica of the output of the PN generator e.g. output 211 or 212 or 213. Where the relative shift depends on the transmitter ID digits 302. The output of the gate 310 is then fed to a shift register 312 whose outputs 323, 322 and 321 are shifted replicas of the PN generator outputs 213, 212, and 211 respectively. When taken three digits at the time, the sequence produced at the output of the shift register is a shifted replica of the output of the PN generator. For example, if the PN sequence produced is order $\{7, 3, 5, 2, 1, 4, 6\}$, and bits $i_5$, $i_4$, $i_3$ are 011 then the shifted sequence is $\{4, 6, 7, 3, 5, 2, 1\}$; if the bits $i_5$, $i_4$, $i_3$ are 101 then the shifted sequence is $\{2, 1, 4, 6, 7, 3, 5\}$. This way, a total of 7 shifted sequences are produced (000 input is not allowed). The shifted sequences are further processed with bits $i_8$, $i_7$ and $i_6$ of the transmitter ID by EXOR gates 318, 316, and 314 to produce permutations of the shifted sequences at the outputs 333—$\{t_2, t_1, t_0\}$ in a manner identical to the previously described in conjunction with frequency index generation. This way, each shifted sequence can be permuted in 8 different ways creating total 7*8=56 shifted-permuted sequences. The shifted and permuted sequences are used to produce variations of the time between consecutive transmissions. In the illustrative embodiment, the numbers from a sequence are multiplied by a dT=2*Tm and added to the nominal time between transmission—TBT. Where, Tm is the nominal message transmission time. Advantageously, dT is rounded to the nearest discrete multiple of a basic time measure unit used by the control logic. If the permuted PN sequences are used as frequency indexes and the shifted-permuted sequences are used to randomize the time between transmission, then there are created 8*7*8=448 sequences that are time-frequency orthogonal in the sense that if two sequences coincide at one frequency and time, they will not coincide for any other frequency and time for the entire PN generator period. This is based on merely 3-bit generator of the illustrative example! Of course, if a longer shift register is used for the PN generator, a far greater number of sequences are created. In the illustrative embodiment, an 8-bit generator is used as described previously. This results in over 16E6 orthogonal time-frequency sequences. Enough to relieve the manufacturer and applications from transmitter ID management other than sequential numbering of all manufactured transmitters. Of course, for a 8 bits shift register, 8 bits of the transmitter ID are used to obtain sequence permutation for frequency index, similarly, 8 bits are used for shifting and another 8 bits for permuting the shifted sequence to obtain the time delay variations.

The essence of this method is that in addition to two apparent dimensions of variability present in the form of permutations of frequency and time sequences, there is a third dimension added: i.e. the phase relationship variability between the frequency and time sequences. This rapidly increases a number of distinct orthogonal frequency-time sequences with increasing length of the basic PN generator as evidenced by the illustrative example. While it is possible to use other kinds of basic sequence and to use other ways of transforming the numbers of the basic sequence to obtain new sequences, the added new dimension has several advantages as evidenced in the illustrative embodiment.

The permutation process as described is an example of a more general process of transformation hat transforms a set of numbers into another set of numbers (that may differ in size). It should be apparent that although a transformation resulting in the permutation as described is advantageous, other transformations may be used to derive frequency-time pattern based on the described principle.

It should also be apparent that in some implementations the order in which the shift and the second transformation (permutation) is performed may be reversed without altering the essence of the method.

Another advantage of the illustrative embodiment is that the permutations and shifting of the sequences can be performed by processing (transforming) one number of the sequence at the time, thus eliminating the need to store and manipulate the entire sequence. I.e., the permuted or shifted sequence numbers are produced one at the time as needed based on numbers from the basic sequence that are also produced one at the time as needed.

Note, that this advantageous way of producing the frequencies does not require any overhead in the transmitted messages for the synchronization purpose other than the transmitter ID that is normally required any way. This is because the receiver can instantly recover the PN generator status based on just a single received message. As described previously, the receiver can infer the status of the 8-bit generator based on the received frequency index and the transmitter ID number. I.e. the message contains the information about the 8-bit generator without explicit inclusion of the generator status bits in the message. In the illustrative embodiment, after the frequency index is obtained for a transmission, the time index is obtained by filling the shift register in the steps of storing the PN generator status, clocking the PN generator and shift register N times, and restoring PN generator status. This way, the content of the shift register 312 is not required by the receiver to obtain synchronization because the time index depends on the future content of the PN generator that can be easily duplicated in the receiver based on the present content. Therefore, the receiver can still synchronize with a transmitter based on one received message and the message does not need to include any overhead for synchronization.

In an alternative implementation, a second PN generator synchronized with the first PN generator may be used to produce the time variations wherein an information about the second generator phase is included in the transmitted message to aid the synchronization. Note, that synchronization of the first and the second generator in the transmitter is extremely important since the essence of the idea is that the cyclic shift of the second sequence is provided in respect to the reference provided by the phase of the first sequence. Only this way the resulting frequency-time hopping sequences produced in different transmitters are distinct and orthogonal.

Although, the described implementation based on a single generator is advantageous since it results in a simpler implementation and lower overhead leading to a longer battery life, the two generator implementation can be modified to ensure low overhead as follows.

Both, first and second PN generators produce basic sequences whose length is $2^N-1$ and $2^M-1$, wherein N and M are the lengths of the respective shift registers in both generators. In order to provide for synchronization between both sequences, each sequence is extended by one bit by inserting one "0" bit at a predetermined place in the sequence. The advantageous place is after N−1 or M−1 "0" bits in the respective sequences. This way the lengths become $2^N$ and $2^M$ respectively which ensures that both sequence lengths are related by a power of 2 (i.e. 2, 4, 8, etc.). Now, it is possible to ensure that both sequences are always in the same phase relation; e.g. after initial reset which sets the generators in a predetermined state, both generators are advanced at the same time. This way, they will return to the exact initial state after the full period of the longer sequence. Of the particular interest is the case of the time generator producing a longer sequence than the frequency generator. In some applications, there is a limited number of frequency channels available, however there is still a need to produce a large number of frequency-time orthogonal sequences. In such case, a longer time sequence can be used to expand the number of possible frequency-time sequences. For example if the frequency generator shift register has N bits and the time generator shift register has M bits, then the total number of sequences is $2^N*(2^M-1)*2^M$ as shown in the preceding examples. Each time M is increased by one, the number of frequency-time sequences is enlarged approximately by a factor of four resulting in a rapid increase of the number of sequences with the increase of the time generator shift register length. Also, the synchronization requires a small overhead because the receiver can infer the frequency generator state and needs only the state of the time generator. However, if the time generator is in precise phase lock with the frequency generator, the transmitter does not need to send the actual time generator state. Instead, the transmitter needs to include the information to remove the uncertainty created by the time sequence period being multiple of the frequency sequence period. E.g., if the time sequence is two times longer, the receiver needs to know if the time generator is in the first half or the second half of the sequence to determine the exact state of the time generator. In this particular case, this information requires only one bit to be included in the transmitted messages. Of course, more bits are required if the time sequence is longer, e.g. if the time sequence is 4 times longer than the frequency sequence, two bits are required; for 8 times longer sequence 3 bits are needed, etc.

The described method (with one or two generators) produce a large number of time-frequency orthogonal sequences in a simple and systematic way that enables the sequence selection by the transmitter ID and requires zero (or very small) overhead for synchronization. A system using a large number of time-frequency orthogonal sequences as described has an advantage of immunity to multipath fading, pulsed and frequency selective interference including intentional jamming, as well as low probability of self interference due to persistent collisions that may occur when two or more transmitters transmit messages on the same frequency and at the same time for a prolonged period. A large number of produced frequencies enables the manufacturer and the system operators not to be concerned with the management of sequences for all the transmitters. Instead, each manufactured transmitter can produce a unique sequence that can be easily replicated in the receiver based just on the transmitter ID.

It is to be understood that the random frequency selection as described above and the time perturbation can be used together or in separation to achieve immunity to collisions. I.e. (a) a fixed frequency pattern for all transmitters and random time perturbation patterns individual for each transmitter can be used, or (b) a fixed time interval between transmissions or fixed time perturbation pattern and random frequency selection individual for each transmitter can be used, or (c) frequency and time changes can be combined to enhance the system performance at the expense of complication.

In the advantageous embodiment, both the transmission frequency and the time interval between transmissions are individually randomized for each transmitter by the transmitter ID bits.

It is also to be understood that one does not have to use the transmitter ID bits to individually predetermine the frequency and/or time patterns for each transmitter. In an alternative design, a random seed can be generated in the transmitter, for example just after reset, and used in lieu of the ID number to modify the frequency and time patterns. If the random seed has many bits, the probability of generating the same pattern by two transmitters in the system is very small. However, this solution is considered inferior because it requires that additional steps are taken to associate the random seed number with the transmitter ID. In addition, this solution requires a good true random number generator that produces numbers with roughly the same probability in order to prevent frequent repetitions of some numbers. Also, although the probability of sequence repetition is small, it may be necessary to include an additional step in the process installing the transmitter to reject a seed number that is already used by another transmitter. All this increases the complexity and the cost and potentially makes the installation more difficult.

It is also to be understood that the illustrated method and its components such as generators, registers, gates, etc., can be realized in various forms of hardware some of which may include ASIC, or software, or their combination.

Figure 2:
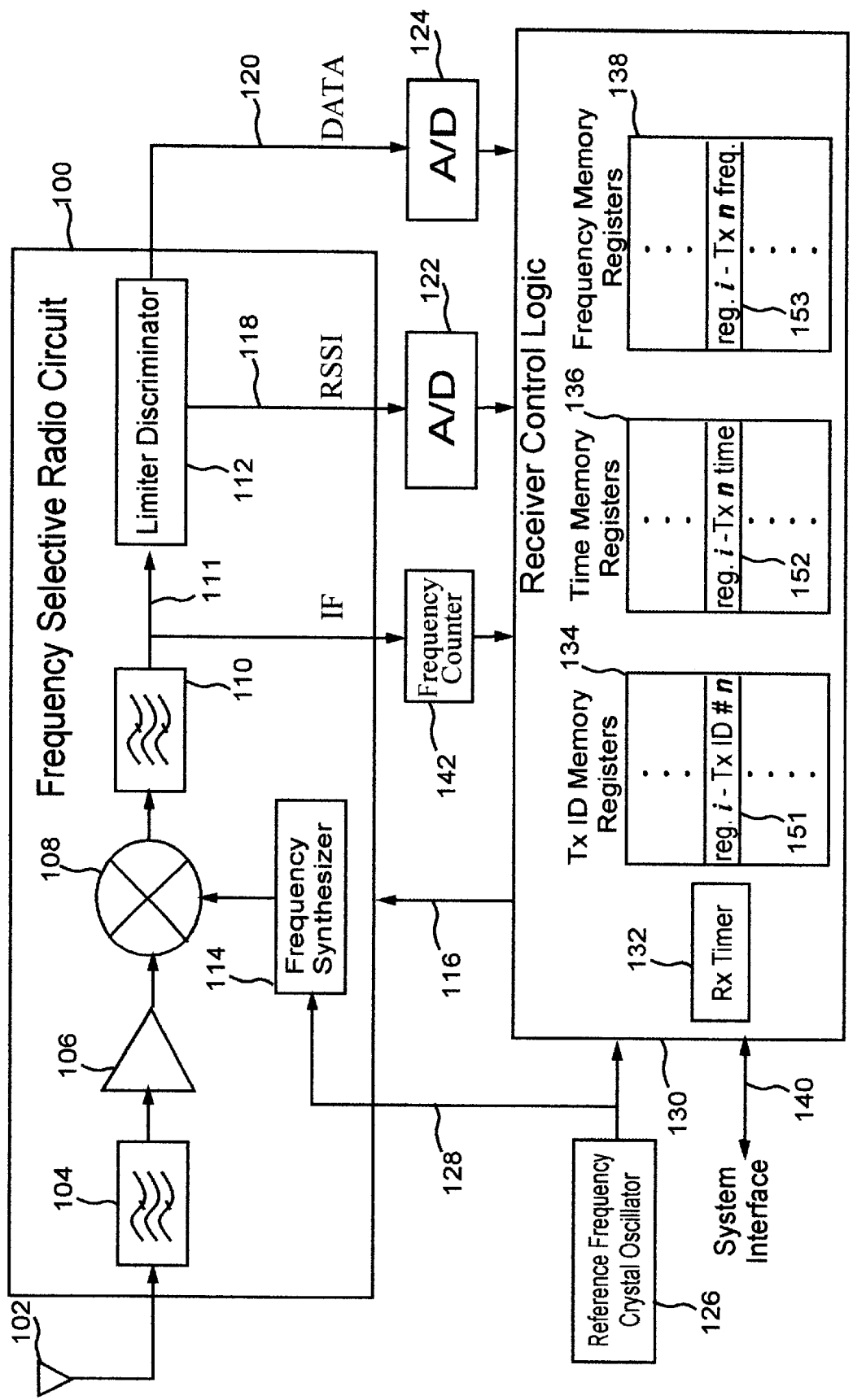
FIG. 2 is a block diagram of a receiver according to a advantageous embodiment of the present invention.

Referring to FIG. 2, the receiver includes a reference frequency crystal oscillator 126 to produce a stable reference frequency on line 128 for the receiver circuits, a frequency selective radio receiver circuit 100 whose frequency is programmable via lines 116, to receive and demodulate a frequency modulated carrier when the frequency of the frequency selective receiver circuit is programmed according to the frequency of the carrier, and a receiver control logic means 130 to process demodulated data, to provide system interface lines 140, responsive to the received data, and to program the frequency of the frequency selective receiver circuit. The control logic includes a receiver timer 132 establishing a time base to measure the elapsing time. The control logic also includes: (a) a plurality of ID memory registers 134 to hold digital data indicative of ID numbers for each transmitter that belongs to the system, (b) a plurality of time memory registers 136 to hold digital data indicative of the time of the next transmission occurrence for each respective transmitter, and (c) a plurality of frequency memory registers 138 to hold digital data indicative of the frequency of the next transmission occurrence for each respective transmitter. In the advantageous embodiment, the registers are organized such that an arbitrary register i 151 of the plurality of ID memory registers 134 associated with a transmitter whose ID number is n, is associated with register i 152 of the plurality of time memory registers 136 and register i 153 of plurality of frequency memory registers 138, wherein said registers 152 and 153 hold data associated with said transmitter n. The frequency selective radio receiver circuit 100 includes a RF band pass filter 104, an amplifier 106, an IF band pass filter 110, a mixer 108, limiter-discriminator circuit 112 and frequency synthesizer 114. The RF band-pass filter selects only the desired frequency band allocated for the transmission, the mixer mixes the incoming signal with the signal produced in the frequency synthesizer and produces an IF frequency (Intermediate Frequency). The IF frequency is filtered in a narrow band filter 110 whose bandwidth is selected according to the channel bandwidth. The limiter discriminator demodulates the signal and produces baseband DATA signal 120 and an RSSI signal 118 indicative of the received signal strength. The DATA signal 120 and the RSSI signal 118 are converted to binary signals by A/D converters 124 and 122 respectively and fed to the control logic 130. The presented architecture of the frequency selective radio receiver circuit 100 is known as a superheterodyne FM receiver, it is very well known and it does not require additional explanation. The transmitted message data is extracted from the DATA signal 120 digitized by the A/D converter 124 using one of the many well-known methods for signal processing and does not require additional explanation.

In the advantageous embodiment, the frequency registers 138 hold for each transmitter the state of the PN generator used by the transmitter to produce the frequency indexes and time variations. If the synchronization is obtained with a given transmitter, the state of the PN generator is identical to that in the transmitter. In the illustrative embodiment, the time registers 136 hold numbers—time of next transmission—for each transmitter representing the state of the receiver timer 132 at the time the next transmission is due from a transmitter.

In operation, the receiver control logic 130 sequentially compares the data content of the time registers 136 with the data content of the receiver timer 132 and if the transmission is due from a transmitter, the control logic programs the frequency selective radio receiver circuit 100 according to the data content in the frequency register 138 for this transmitter, attempts to decode the demodulated signal, changes the content of the time register based on the number representative of the time interval between the transmissions for this transmitter and changes the content of the frequency register according to a predetermined algorithm for this transmitter. I.e. the frequency and the time registers are updated each time a transmission is due regardless whether the packet was received successfully. The new content of the frequency register is determined according to the algorithm for the frequency use by the transmitters.

The new content of the time register is calculated based on the current content of the receiver timer and a number representative of the time between the current transmission and the next transmission for this transmitter, wherein said number is calculated based on the nominal value of the time between the transmissions and adjusted by the pseudo random perturbation performed according to the previously described algorithm. In addition, said number is corrected by a correction factor based on the measured difference between the transmitter time base and the time base of the receiver, wherein said difference is determined in a manner described later in details. In the advantageous embodiment, the numbers representative of the time base differences are stored in the time registers 136 separately for each transmitter and are independent from the numbers representing the time of the next transmission, i.e. the time registers are split to hold two independent numbers.

It should be noted that even if crystal oscillators are used in the transmitters and the receiver to control the timing, the error accumulated during the time between transmissions can be significant compared to the packet time. For example, if the nominal period between the transmissions is 100 seconds and the crystal frequency error due to tolerance and temperature changes is +/−20 ppm (parts per million) for the transmitter and +/−10 ppm for the receiver, then the error may be as large as 3 ms. If the time for the transmission of one packet is 5 ms, then the error is significant. In reality, such tight tolerance is difficult to achieve and expensive and therefore in many applications a much bigger error will be accumulated. In order to minimize the time error accumulated during the long time between the transmissions, the receiver can store the time difference between the ideal and the actual time of the packet reception and use the difference to predict more accurately the next transmission time. For example, if the timer resolution is 0.25 ms, then the next transmission time can be predicted with accuracy 0.25 ms, providing that the temperature does not change appreciably over 100 s period. This represents an improvement of an order of magnitude. I.e. the receiver can program its frequency 0.25 ms in advance to each new frequency, examine it for the duration of the packet, then program to the next frequency and so on.

During the acquisition, when the time error is not known, the receiver needs to tune to the first frequency at least 3 ms in advance. Then, the receiver monitors the received signal by observing the RSSI signal 118 and DATA signal 120. If during the next 6 ms no valid signal is present, the receiver programs to the next frequency 3 ms in advance and so on. Of course, if worse tolerances are used, the time the receiver dwells on a single frequency expecting the next transmission is proportionately longer.

Some embodiments of the present invention relates to the reading of electric utility meters. In such embodiments, the transmitters advantageously use the power-line as a frequency reference from which the time intervals between transmissions are derived. The advantage of this arrangement is that all transmitters time drifts in the same proportions relative to the receiver. This can ease the receiver task of acquisition as well as tracking.

However, in the illustrative embodiment, to ease this acquisition problem, the receiver includes a frequency error detection means and a method as described below.

In the advantageous embodiment, the receiver includes a frequency error detection means 142 that is advantageously implemented as a simple digital counter, in order to detect the frequency error in the received signal in respect to the receiver reference frequency by measuring the frequency error of the intermediate frequency signal 111. In addition, in the transmitter, the transmitted carrier frequency and the time interval generator timing are derived from the same source and in the receiver, the receiver frequency and the receiver timer are derived from the same reference. In operation, the receiver can measure the frequency difference between the transmitted carrier and the receiver frequency and use the measured error to determine the difference between the transmitter reference frequency and the receiver reference-frequency based on just one partially decoded message. The frequency difference measurement is accomplished in the following way. Assuming that the transmitter frequency accuracy is +/−20 ppm and the receiver is +/−10 ppm, the carrier frequency is 915 MHz and the IF frequency is 10.7 MHz, the absolute maximum error between the receiver frequency synthesizer and the received carrier can be as much as 2760 Hz (915E6*20E-6+925.7E6*10E-6). I.e., the resulting IF frequency is offset from its nominal value by this amount. This represents 260 ppm of the nominal IF frequency. An ordinary frequency counter with a time base accuracy determined by the receiver crystal oscillator, i.e. +/−10 ppm can detect this error and measure it with good accuracy. The accuracy should be better than +/−10 Hz (1/26 of the maximum error). Based on the measured frequency error, the relative frequency offset is calculated and the time correction factor for each transmitter is adjusted accordingly. For example, if the measured error is +1380 Hz then the relative frequency error is approximately equal to +15 ppm. If the nominal value of the time interval between two consecutive transmissions is 100 seconds, then the required correction is +1.5 ms if the receiver uses high injection, i.e. the frequency of the synthesizer in the receiver is nominally equal to the received frequency plus the IF frequency, and −1.5 ms if low injection is used.

In the advantageous embodiment, the time base correction factor stored for each transmitter is also used to adjust the center frequency of the receiver and thus aid the reception of the transmitted packets, thus lowering the requirements for the length of the preamble included in each packet for the purpose of carrier and data timing acquisition. This is accomplished by adjusting the receiver frequency momentarily just prior to the reception of the packet from a transmitter from which a packet is due.

In operation, the receiver scans the alarm frequencies during the time when it is not occupied with the scheduled reception from the transmitters or checking the time registers. Also the receiver scans all the available frequencies in addition to the alarm frequencies. During the scan, the receiver uses RSSI signal to detect if there is an energy transmitted on a current frequency; if so, then the receiver measures a predetermined unique properties of the modulated carrier. If the energy is not present or the unique property is not valid, the receiver will quickly proceed to examine the next frequency. Otherwise the receiver will stay on this frequency and try to decode the message. This way all the alarm frequencies are examined several times per second ensuring that the receiver can receive the alarm message with a minimum delay. Also, the scan of all available frequencies is fast; the synchronization can be regained faster and more reliably because the receiver will not waste much of the time for an examination of very weak or spurious signals.

In the advantageous embodiment, when a transmitter is powered up, for example after a battery replacement, it enters a power-up mode during which a predetermined number of packets are transmitted on the alarm frequencies in a way similar to the transmission of alarm packets. In the power-up transmission sequence, each packet includes a number that indicates how many packets the transmitter has transmitted in this mode or how many packets the transmitter will transmit in this mode before entering a normal mode of operation. This way, the receiver can synchronize with the transmitter just after a single packet reception by calculating when the first transmission will occur in the normal mode.

In the advantageous embodiment, the transmitter ID numbers for each transmitter stored in the receiver ID memory registers 134 are acquired and stored by the receiver during a process of log-in. Each new transmitter to be logged-in is placed in a relatively close proximity to the receiver and then powered up. A very high level of the received signal ensures that the new transmitter signal is not mistaken for another transmitter. A successful log-in is confirmed by the receiver using an audio or a visual indicator that can be included in the receiver or in the system controller connected to the receiver via system interface 140. The receiver may reject the transmitters that can cause persistent collisions, i.e. if its ID number has the last 24 digits identical to another transmitter already present in the system.

In the illustrative embodiment described here, references are made to several elements such as generators, logic, registers, etc. It is to be understood that various elements described here can be realized in several different forms including software and hardware in their various forms and combinations.

Although illustrative embodiments of the invention have been described in detail herein with reference to the accompanying drawings, it is to be understood that the invention is not limited to those precise embodiments, and that various changes and modifications can be effected therein by one skilled in art without departing from the scope and spirit of the invention as defined by the appended claims.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method of transmitting telemetry, said method comprising in each of a plurality of transmitters:
    producing a first sequence based on a first group of selecting bits, and
    producing a second sequence based on a second group of selecting bits, wherein said second sequence is shifted relative to said first sequence according to a third group of selecting bits, and
    transmitting intermittently transmissions independently of any apparatus capable of receiving any of said transmissions and independently of any other of said plurality of transmitters, wherein transmission frequency and transmission time interval are varied based on said first sequence and said second sequence.

2. The method of claim 1 wherein each of said plurality of transmitters comprises an identification and at least one of said first, second, and third group of selecting bits is based on said identification.

3. The method of claim 1 wherein each of a plurality of said transmissions comprises at least a portion of data indicative of at least one of said first, second, and third group of selecting bits.

4. The method of claim 1 wherein said first sequence and said second sequence are selected by transforming a basic sequence by said first and second group of selecting bits respectively.

5. The method of claim 1 wherein said first, second and third group of selecting bits, in combination, are different for each of said plurality of transmitters.

6. A plurality of telemetry transmitters each of which comprises:
    a circuit for transmitting intermittently transmissions independently of any apparatus for receiving any of said transmissions and independently of any other of said plurality of transmitters, and
    logic for varying, for said transmissions, transmission frequency channel and transmission time interval according to a frequency-time hopping pattern based on: (a) a first sequence selected according to a first group of selecting bits and (b) a second sequence selected according to a second group of selecting bits, wherein said second sequence is shifted relative to said first sequence according to a third group of selecting bits.

7. The plurality of transmitters of claim 6 wherein each of said plurality of transmitters comprises an identification and at least one of said first, second, and third group of selecting bits is based on said identification.

8. The plurality of transmitters of claim 6 wherein each of a plurality of said transmissions comprises at least a portion of data indicative of at least one of said first, second, and third group of selecting bits.

9. The plurality of transmitters of claim 6 wherein said first sequence and said second sequence are selected by transforming a basic sequence by said first and second group of selecting bits respectively.

10. The plurality of transmitters of claim 6 wherein said frequency-time hopping pattern is different for each of said plurality of transmitters.

11. A system comprising:
    a plurality of transmitters, each of which is for transmitting intermittently transmissions, at varied time interval and at varied transmission frequency, independently of any receiver capable of receiving any of said transmissions and independently of any other of said plurality of transmitters, and a receiver for holding, simultaneously for each of said plurality of transmitters, data indicative of an expected time and an expected frequency of at least one future transmission, wherein for each of said plurality of transmitters, said data is based on a frequency-time hopping pattern based on: (a) a first sequence selected according to a first group of selecting bits and (b) a second sequence selected according to a second group of selecting bits, wherein said second sequence is shifted relative to said first sequence according to a third group of selecting bits.

12. The system of claim 11 wherein said receiver comprises a frequency selective circuit, and wherein in operation, for each of said plurality of transmitters, said receiver changes frequency of said frequency selective circuit to said expected transmission frequency at such time relative to said expected time to receive and demodulate said at least one future transmission.

13. The system of claim 11 wherein each of said plurality of transmitters comprises an identification and at least one of said first, second, and third group of selecting bits is based on said identification.

14. The system of claim 11 wherein each of a plurality of said transmissions comprises at least a portion of data indicative of at least one of said first, second, and third group of selecting bits.

15. The system of claim 11 wherein said frequency-time hopping pattern is different for each of said plurality of transmitters.

* * * * *